United States Patent Office 3,133,068
Patented May 12, 1964

3,133,068
5-SUBSTITUTED DIBENZ[b,f]AZEPINE
COMPOUNDS
Walter Schindler, Riehen, near Basel, Switzerland, assignor to Geigy Chemical Corporation, Ardsley, N.Y., a corporation of Delaware
No Drawing. Filed Aug. 10, 1959, Ser. No. 832,498
Claims priority, application Switzerland May 9, 1957
10 Claims. (Cl. 260—268)

This application is a continuation-in-part of copending application Serial No. 729,504, filed on April 21, 1958 (and abandoned since the filing of the present application).

The present invention concerns new basically substituted azepines which have valuable pharmacological properties, as well as processes for the production thereof.

5-dibenzo[b.f] azepine, termed iminostilbene in the following, and derivatives thereof have not been known up to now. It has now been found that N-substituted iminostilbenes of the general formula:

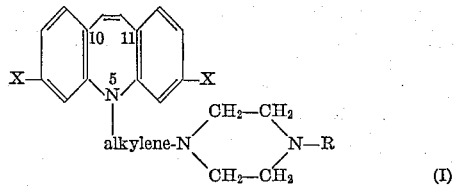

(I)

wherein
X represents hydrogen or a chlorine atom,
alkylene represents a 2–6 carbon alkylene chain separating the adjacent nitrogen atoms to which it is attached by at least two carbon atoms, and
R represents a lower alkyl, lower alkanoyloxyalkyl or lower hydroxalkyl radical,
have valuable pharmacological properties and, in particular, are useful as antiallergics, anti-emetics, sedatives, anticonvulsants, antipyretics and anti-inflammatory agents. For the treatment, e.g., of allergic diseases, adults are treated with about 75–150 mg. daily of 5-[3'-(4''-methyl-piperazino)-propyl]-iminostilbene or 5-[3'-(4''.β-hydroxyethyl - piperazino) - propyl] - iminostilbene per os. The compounds according to the invention however, can also be administered parenterally, e.g., by intramuscular injection of aqueous solutions of their salts such as their hydrochlorides. They are further useful for the treatment of certain forms of mental ailments. When used as mental drugs, they may be administered perorally in doses of 25 mg. five to ten times daily for adults. Similar doses of the new compounds in the form of aqueous solutions of their salts may be administered parenterally, e.g., intramuscularly.

Particularly valuable are compounds of the above Formula I wherein R is the methyl, hydroxyethyl or acetoxyethyl radical and alkylene is the 1.3-propylene radical (trimethylene radical).

The new compounds are produced by reacting an iminostilbene of the general formula

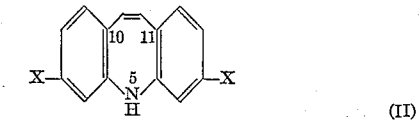

(II)

in the presence of an acid binding agent, or reacting a metal compound of such an iminostilbene with a reactive ester of an amino alcohol of the general formula

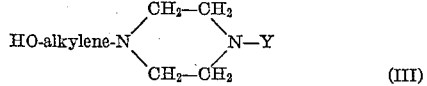

(III)

wherein Y represents a low molecular alkyl or alkanoyloxyalkyl radical and X and alkylene have the meanings given above, if desired then hydrolysing compounds in which Y is an alkanoyloxyalkyl radical to form corresponding compounds having a hydroxyalkyl radical R.

In particular sodium amide, lithium amide, potassium amide, sodium, lithium or potassium are suitable acid binding agents; and the alkali metal compounds are suitable as metal compounds of the iminostilbenes. Particularly the halides, also for example, aryl sulphonic acid esters and alkali metal salts of acid sulphuric acid esters are used as reactive esters of amino alcohols of the general Formula III; in particular can be named:

β-(4-methyl-piperazino)-ethyl chloride,
β-(4-isopropyl-piperazino)-ethyl chloride,
β-(4-allyl-piperazino)-ethyl chloride,
β-(4-ethyl-piperazino)-propyl chloride,
β-(4-isobutyl-piperazino)-propyl chloride,
γ-(4-methyl-piperazino)-propyl chloride,
γ-(4-isopropyl-piperazino)-propyl chloride,
δ-(4-methyl-piperazino)-butyl chloride and
ω-(4-methyl-piperazino)-hexyl chloride.

Iminostilbene and 3.7-dichloro-iminostilbene are the starting compounds of general Formula II. They are obtained from iminodibenzyl or 3.7-dichloro-iminodibenzyl respectively by converting them into the N-acyl derivatives which can be easily split, halogenating, for example with bromosuccinimide, splitting off hydrogen halide and hydrolyzing.

Compounds of the general Formula I can also be produced by reacting a reactive ester of an N-hydroxyalkyl-iminostilbene of the general formula:

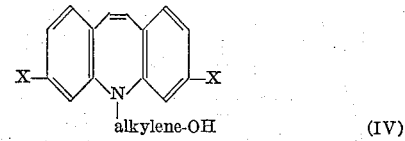

(IV)

wherein alkylene and X have the meanings given above, in particular an ester of a halogen hydracid or aryl sulphonic acid, with an N-substituted piperazine of the general formula:

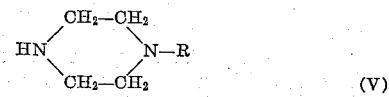

(V)

wherein R has the meaning given above, and if desired, then hydrolysing compounds in which R is an alkanoyloxyalkyl radical to the corresponding compounds having a hydroxyalkyl radical R.

Starting materials of the general Formula IV are obtained for example, by reacting alkali metal compounds of iminostilbenes of the general Formula II with reactive diesters of alkandiols, in particular those with two different acid components such as, for example α-bromo-β-chloralkanes, α-bromo-ω-chloralkanes, aryl sulphonic acid esters of chloralkanols and bromalkanols as well as alkali metal salts of acid chloralkyl and bromalkyl sulphuric acid esters. Examples of N-substituted piperazines of the general Formula V are N-methyl-, N-ethyl-, N-n-propyl-, N-β-hydroxyethyl-, N-γ-hydroxypropyl-, N-δ-hydroxybutyl- and N.β-acetoxyethyl-piperazine.

In addition, N-substituted iminostilbenes of the general Formula I can be produced by reacting a piperazino-alkyl-iminostilbene of the general formula

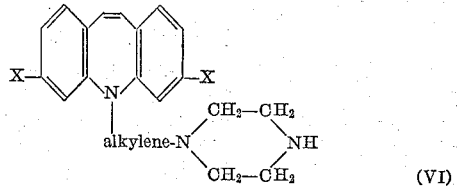

(VI)

with a reactive ester of an alcohol of the general formula:

$$R-OH \qquad (VII)$$

wherein X, alkylene and R have the meanings given above; or with a low molecular alkylene oxide. Starting materials of the general Formula VI are obtained analogously to the end products of the general Formula I by reacting alkali metal compounds of iminostilbenes with reactive esters of piperazino alkanols not substituted in the 4-position. As reactive esters of alcohols of the general Formula VII can be named methyl bromide, methyl iodide, ethyl bromide, ethyl iodide, n-butyl bromide, dimethyl sulphate, diethyl sulphate, β-chlorethyl acetate and β-bromoethyl acetate. As alkylene oxides can be named ethylene oxide and propylene oxide.

Further, the new N-substituted iminostilbenes of the general Formula I can also be produced by reacting an iminostilbene of the general Formula II, possibly in the presence of an acid binding agent, or reacting a metal compound of such an iminostilbene, with phosgene, reacting the resultant 5-chlorocarbonyl-iminostilbene with an amino alcohol of the general Formula III and heating the 5-(carbo-piperazino-alkoxy)-iminostilbene so obtained of the general formula:

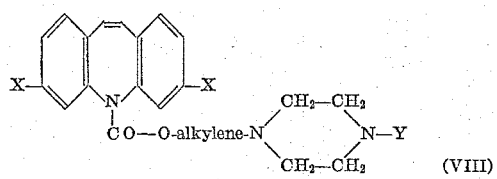

(VIII)

wherein alkylene, X and Y have the meanings given above, until carbon dioxide is split off.

Finally, compounds of the general Formula I in which R is a lower hydroxyalkyl radical can be esterified to form compounds of the same general Formula I in which R is a lower alkanoyloxyalkyl radical.

The tertiary bases form salts with inorganic or organic acids such as hydrochloric acid, hydrobromic acid, sulphuric acid, phosphoric acid, methane sulphonic acid, ethane sulphonic acid, ethane disulphonic acid, acetic acid, citric acid, malic acid, succinic acid, maleic acid, fumaric acid, tartaric acid, benzoic acid and phthalic acid. Some of these salts are water soluble.

The following examples illustrate the production of the new compounds. Parts are given as parts by weight and their relationship to parts by volume is as that of grammes to cubic centimetres. The temperatures are in degrees centigrade.

*Example 1*

9.7 parts of iminostilbene are dissolved in 150 parts by volume of anh. benzene and the base from 15 parts of 1-(γ-chloropropyl)-4-methyl-piperazine dihydrochloride in 300 parts by volume of benzene is added. A suspension of 2.5 parts of sodium amide in toluene is added dropwise at 40–50° while stirring well. The reaction mixture is stirred for 3 hours at 50° and then boiled under reflux for 16 hours. It is then cooled to room temperature and water is added. The benzene phase is removed and shaken out several times with diluted acetic acid. The combined acetic acid extracts are made alkaline with concentrated caustic soda lye. The precipitated oil is taken up in petroleum ether, the solution is dried and concentrated to a small volume whereupon crystallisation occurs. The N-[γ-(4-methyl-piperazino)-propyl]-iminostilbene so obtained melts at 86–88°.

*Example 2*

13 parts of 3.7-dichloro-iminostilbene are dissolved in 300 parts by volume of anh. benzene and the solution of the base from 14 parts of 1-(γ-chloro-propyl)-4-methyl-piperazine dihydrochloride in 200 parts by volume of anh. benzene is added. 2.5 parts of sodium amide, suspended in toluene, are added dropwise at 50° while stirring well. The reaction mixture is then stirred for 3 hours at 50° and then boiled for 16 hours under reflux. It is then cooled to room temperature and water is added. The benzene phase is removed and shaken out several times with diluted hydrochloric acid. The combined hydrochloric acid extracts are made alkaline with concentrated alkali lye whereupon the N-[γ-(4-methyl-piperazino)-propyl]-3.7-dichloro-iminostilbene crystallises out. It is of advantage to recrystallise it from benzine, whereupon it melts at 128–129°.

The following compounds may be prepared in an analogous manner:

N-[β-(4-isopropyl-piperazino) - ethyl] - iminostilbene or -3.7-dichloro-iminostilbene, and N - [γ - (4 - acetoxyethyl - piperazino) - propyl] - iminostilbene.

*Example 3*

19 parts of iminostilbene and 20 parts of 1-chloro-3-bromopropane are dissolved in 800 parts by volume of anh. benzene and 4.4 parts of sodium amide in toluene are added dropwise while stirring strongly, the addition being made within half an hour at 50°. On completion of the dropwise addition, the whole is stirred for another 3 hours at 50–60° and then refluxed for 3 hours. After cooling, water is added to the reaction mixture and the benzene phase is separated, washed with water, dried and concentrated. The oily residue is dissolved in 400 parts by volume of petroleum ether, any undissolved iminostilbene is filtered off and the solvent is evaporated. Oily N-(γ-chloropropyl)-iminostilbene remains which, after recrystallisation from anh. ether, melts at 67°.

19 parts of the oily residue are dissolved in 130 parts by volume of butanone and, after the addition of 10 parts of sodium iodide, are stirred under reflux for 16 hours with 19 parts of N-(β-hydroxyethyl)-piperazine. The solvent is then distilled off, water is added and the whole is thoroughly extracted with ether. After thoroughly washing with water, the ethereal solution is extracted three times with diluted hydrochloric acid. The acid extracts are made alkaline and the precipitated base is dissolved in ether. After drying the ethereal solution with sodium sulphate and evaporating the solvent, N-[γ-(4-hydroxyethyl-piperazino) - propyl] - iminostilbene remains. M.P. 100°.

The dihydrochloride prepared with alcoholic hydrochloric acid melts at 228–230°

N-[γ-(4 - hydroxyethyl-piperazine)-propyl]3.7-dichloroiminostilbene and its dihydrochloride can be produced in an analogous manner.

*Example 4*

1 part of N-[γ(4-hydroxyethyl-piperazino)-propyl]-iminostilbene and 5 partes of acetic acid anhydride are refluxed for 4 hours. The excess acetanhydride is evaporated in the vacuum, the residue is dissolved in cold water, the solution is filtered and the filtrate is made alkaline with sodium carbonate solution. The precipitate is dissolved in either, the ether solution is washed with water, dried over sodium sulphate and the solvent is distilled off. The residue is dissolved in petroleum ether, the solution is filtered and the filtrate is concentrated. N-[γ-(4-acetoxyethyl-piperazino)-propyl]-iminostilbene is obtained as a yellow oil.

1 part of this oil is dissolved in as little acetone as possible and then the calculated amount of anh. alcoholic hydrochloric acid is added. After some time the dihydrochloride crystallises out and, when recrystallised from alcohol, it melts at 209–212°.

In an analogous manner, N-[γ-(4-acetoxyethyl-piperazino))-propyl]-3.7-dichloro-iminostilbene and its dihydrochloride are are obtained from N-[γ-(4-hydroxyethyl-piperazinzon)-propyl]-3.7-dichloro-iminostilbene.

What I claim is:
1. A basic derivative of an azepine of the formula:

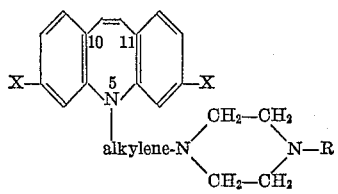

(I)

wherein
X represents a member selected from the group consisting of hydrogen and chlorine,
alkylene represents a 2–6 carbon alkylene chain separating the adjacent nitrogen atoms to which it is attached by at least two carbon atoms, and
R represents a member selected from the group consisting of lower alkyl, lower alkanoyloxyalkyl and lower hydroxyalkyl.

2. N-[γ-(4-methyl-piperazino)-propyl]-iminostilbene.
3. N-[γ-(4-methyl - piperazino)-propyl]-3.7-dichloro-iminostilbene.
4. N[β-(4-isopropyl-piperazino)-ethyl]-iminostilbene.
5. N-[β-(4-isopropyl - piperazino)-ethyl]-3.7-dichloro-iminostilbene.
6. N-[γ-(4-hydroxyethyl-piperazino)-propyl]-iminostilbene.
7. N-[γ-(4 - acetoxyethyl - piperazino)-propyl]-iminostilbene.
8. N-[γ-(4 - hydroxyethyl - piperazino)-propyl]-3.7-dichloro-iminostilbene.
9. N-[γ-(4 - acetoxyethyl-piperazino) - propyl]-3.7-dichloro-iminostilbene.
10. A compound of the formula

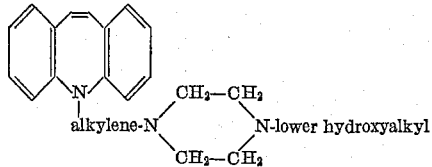

wherein alkylene is a lower alkylene chain separating the adjacent nitrogen atoms to which it is attached by at least two carbon atoms.

References Cited in the file of this patent
UNITED STATES PATENTS

| | | |
|---|---|---|
| 2,541,211 | Cusic | Feb. 13, 1951 |
| 2,676,966 | Cusic | Apr. 27, 1954 |
| 2,676,971 | Cusic | Apr. 27, 1954 |
| 2,861,987 | Martin | Mar. 25, 1958 |